May 15, 1956  R. KOLLGAARD  2,745,724
DISENGAGEMENT OF GASES FROM A MOVING
BED OF FLUENT SOLID PARTICLES
Filed Aug. 23, 1952  2 Sheets—Sheet 2
*Fig.3.*
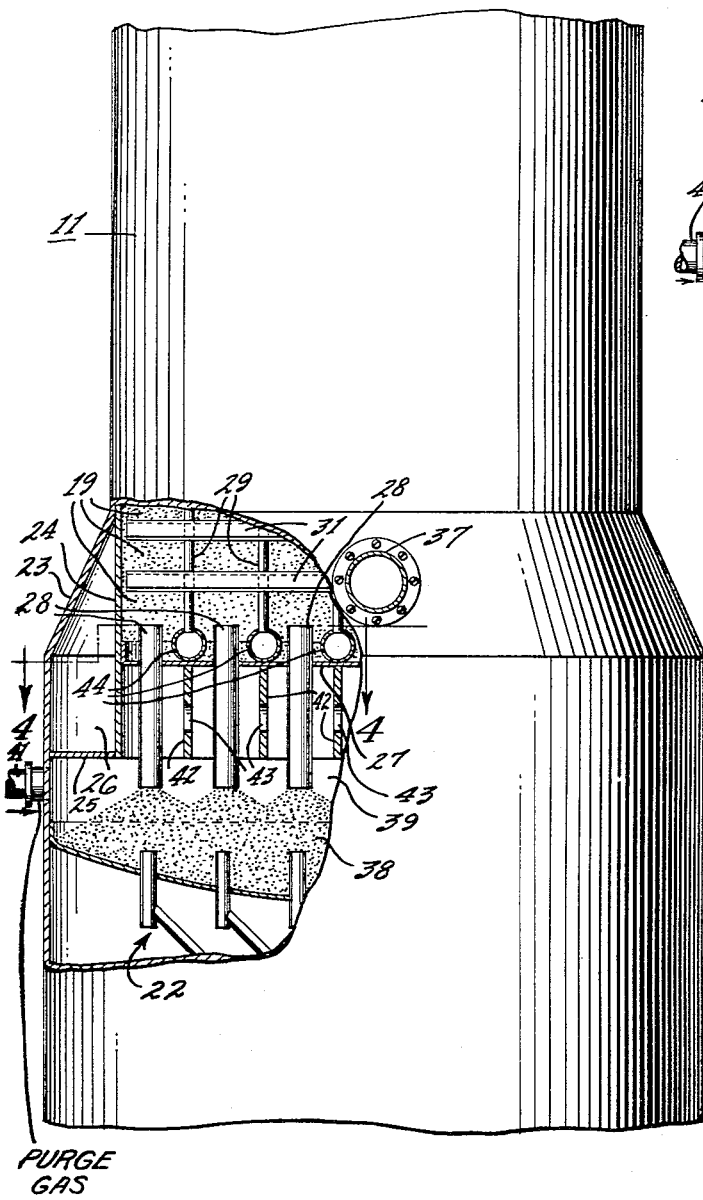
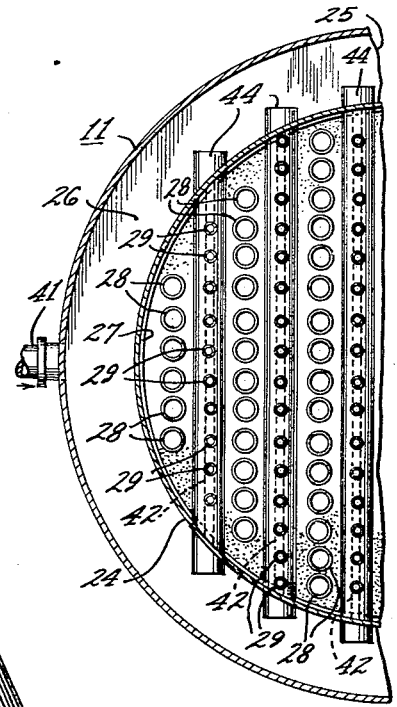
*Fig.4.*
PURGE
GAS
INVENTOR.
Reyner Kollgaard
BY William Klabunde
ATTORNEY United States Patent Office 2,745,724
Patented May 15, 1956

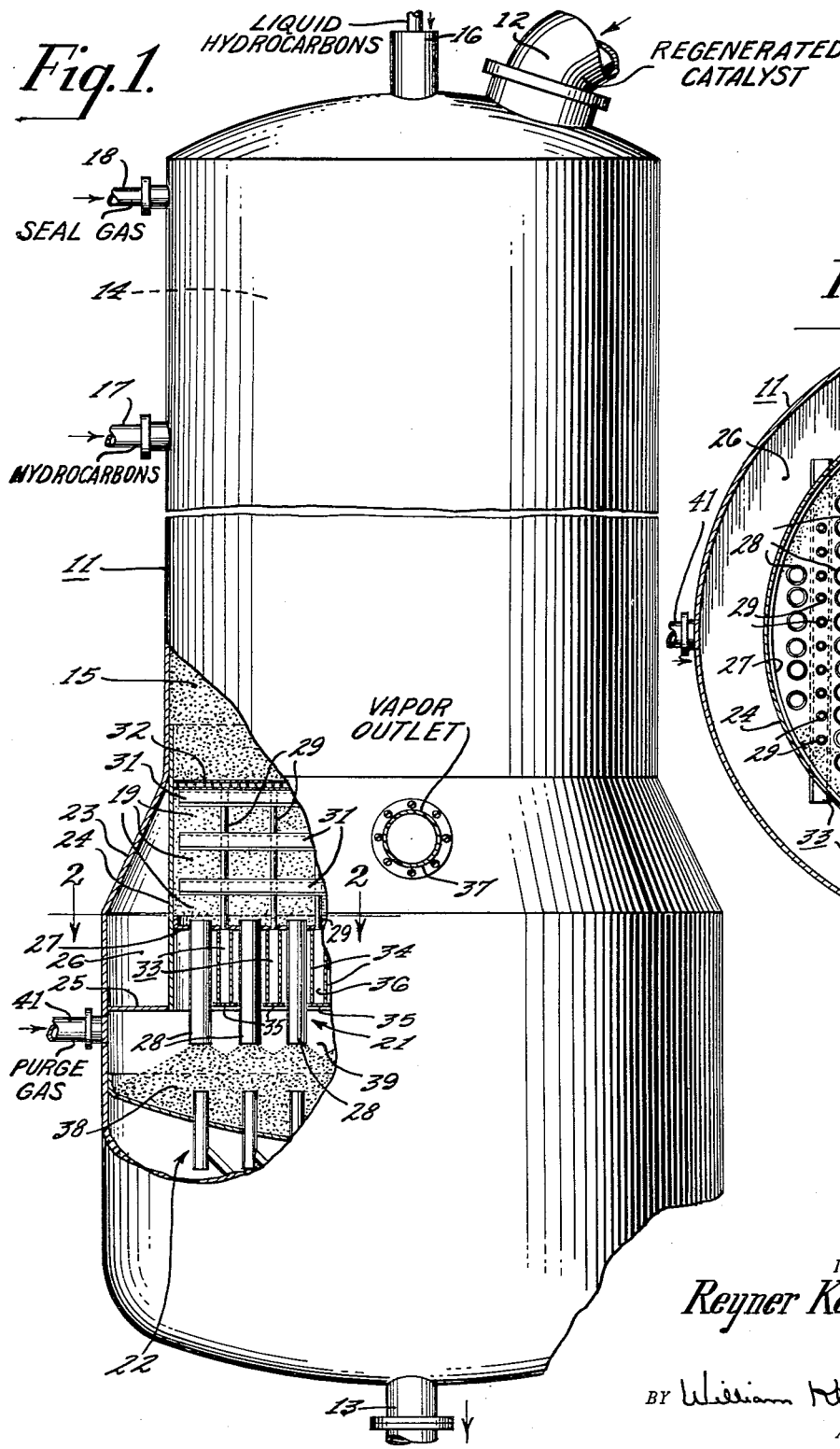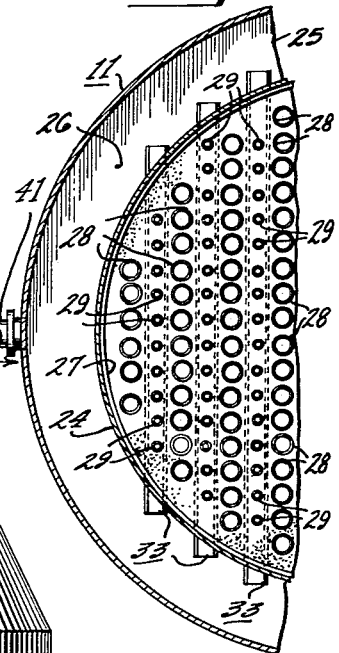

2,745,724

DISENGAGEMENT OF GASES FROM A MOVING BED OF FLUENT SOLID PARTICLES

Reyner Kollgaard, San Mateo, Calif., assignor to Houdry Process Corporation, Wilmington, Del., a corporation of Delaware Application August 23, 1952, Serial No. 305,971

4 Claims. (Cl. 23—288)

This invention relates to a method and apparatus for disengaging gaseous material from a downwardly-moving compact mass of fluent solid particles, and has particular application to hydrocarbon conversion processes involving the contact of gaseous hydrocarbon material with granular contact material, such as catalyst, in the form of beads or pellets having a particle size in the order of about 2–15 millimeters in diameter.

The invention is specifically directed to certain method and apparatus improvements in a system for effecting multi-level disengagement of gaseous material from granular contact material in the lower region of a vertically elongated contact zone, through which zone the contact material gravitates as a compact moving bed in concurrent flow relation with the gaseous material, the disengaging step being immediately followed by a purging step in which the compact moving bed is contacted with countercurrently flowing purge gas to displace the vaporizable hydrocarbons which are carried by the contact material below the lowermost disengaging level.

Typical of commercially successful systems of this type is that disclosed in my copending application, Serial No. 247,684, filed jointly with Reuben T. Savage on September 21, 1951. Briefly, the embodiment illustrated in the copending application discloses a system in which disengagement of gaseous material from a gravitating compact bed of catalyst is effected at three levels, the gaseous material being collected at each level in catalyst-free spaces formed beneath inverted channel members. The channel members are parallel and are arranged in vertical tiers, each tier having three channel members. Vertical conduits connect the channels of each tier. The channels are approximately equal in width, but those at the lowermost level are considerably deeper than the others. The gaseous hydrocarbons disengaged at the upper levels are conveyed to the lowermost channels and are discharged therefrom into a gas-collecting plenum which, in turn, discharges the same from the conversion vessel. Purging gas is passed countercurrently through a compact moving bed of the catalyst formed directly beneath the disengager and is disengaged therefrom partly into the channels at the lowermost disengaging level, and partly into the plenum, which is in open communication with a portion of the bed. The purging gas, together with the vaporous hydrocarbons which it displaces and the vaporous hydrocarbons disengaged at all three levels are collected in the deep channels constituting the lowermost level of disengagement and are conveyed into the plenum.

While the foregoing system represents a substantial saving in vertical height over other systems heretofore employed, improvements which will effect still further savings in vertical height are constantly being sought.

In accordance with the present invention, the gaseous reaction products are disengaged from the granular contact material at horizontally-spaced internal exposed surfaces formed at a plurality of levels within the lower region of the compact moving bed and are conveyed downwardly as confined streams to parallel gas-collecting zones extending horizontally at a common level across the bottom of the reactor bed, while the contact material is passed as confined compact streams downwardly between the gas-collecting zones from the bottom of the reactor bed directly onto the surface of a shallow compact moving bed spaced therebelow, the gas-collecting zones being located at a level between the ends of said compact streams.

Purge gas is introduced into the space or plenum formed between the reactor bed and the shallow bed and flows upwardly through compact moving streams of contact material into the lower region of the reactor bed where it is disengaged at the lowermost disengaging level. All the disengaged gaseous reaction products and the purge gas are conveyed downwardly into the horizontal gas-collecting zones and are passed from the ends thereof into a gas manifold, from which they are subsequently discharged.

The manifold may be located either internally or externally of the vessel, the latter location being preferred in systems where the reactor comprises a cylindrical vessel of smaller diameter concentrically superimposed upon a wider vessel containing the regenerating zone, in which case the smaller diameter vessel may extend a distance within the larger vessel and the annular space therebetween may be closed at its ends to form a manifold encircling the vessel. In cases where the design of the conversion unit is such that the vessel containing the various zones comprises a single cylindrical housing of uniform diameter throughout, so that there is no convenient annular space formed between interengaging cylindrical members of different diameter which may be utilized as a gas-receiving manifold, a separate manifold chamber must be provided. Such manifold chamber may be in the form of a so-called "blister" surrounding the cylindrical housing, or it may be in the form of an internal manifold comprising a hollow central beam or conduit extending horizontally through the vessel and communicating with the horizontally elongated gas-collecting zones through openings provided along the sides of the hollow central beam.

For a clearer understanding of the invention, reference may be had to the accompanying drawing forming a part of this application in which:

Figure 1 is an elevational view, in partial section, of a reactor for carrying out hydrocarbon conversions in the presence of a gravitating compact mass of granular catalyst;

Figure 2 is a fragmentary horizontal section taken along the line 2—2 of Figure 1;

Figure 3 is a fragmentary sectional view of the reactor of Figure 1, showing a modification of the disengager; and Figure 4 is a fragmentary horizontal section taken along the line 4—4 of Figure 3.

Referring to the drawing, Figure 1 shows an elongated generally cylindrical vessel 11 for carrying out the desired hydrocarbon conversion. Regenerated catalyst in the form of granular particles ranging in size between 1–15, and preferably 2–8, millimeters in diameter is introduced into the upper end of vessel 11 through inlet 12. In known manner, the catalyst is caused to flow downwardly through the vessel 11 in the form of a compact moving mass and is withdrawn from the lower end of the vessel through catalyst outlet 13. The rate of catalyst withdrawal is controlled in known manner at some lower level in the outlet line 13, in order to maintain the granular catalyst within the vessel 11 in the form of a vertically continuous compact moving mass.

Similar to the arrangement disclosed in my copending application, Serial No. 247,684, the vessel 11 may comprise a catalyst storage hopper or distributing chamber at its upper end, located within the general region of the vessel indicated by the numeral 14; an elongated conversion zone directly below the storage hopper adapted to contain a bed 15 of the catalyst; a liquid hydrocarbon inlet 16 and a hydrocarbon vapor inlet 17 through which hydrocarbons are introduced into the upper region of the conversion zone; a seal gas inlet 18 through which inert gas is introduced for known purposes; a disengaging region, generally indicated by the numeral 19, wherein the gaseous products of conversion flowing concurrently with the catalyst are separated therefrom; a purging region, generally indicated by the numeral 21, wherein the catalyst is purged of additional vaporizable hydrocarbons by contact with countercurrently flowing purge gas; and catalyst withdrawal means 22 at the lower end of the vessel 11 adapted, in known manner, to effect a uniform downward movement of the catalyst throughout the entire horizontal cross-sectional area of the bed 15, without any substantial horizontal velocity gradient.

Since the present invention is concerned only with disengaging and purging of the gaeous products of conversion from the granular catalyst, the vessel 11 has been broken away to show only a portion of the region containing the disengaging and purging devices. The remaining portions of the apparatus necessary to carry out the desired conversion are not shown in detail, since they are of known design.

Liquid hydrocarbon material introduced into the upper end of the vessel 11 through inlet 16 is conveyed as a confined stream through the storage hopper 14 and is discharged in known manner into the upper region of the conversion zone, suitable means being provided to bring about intimate contact between the liquid hydrocarbons and the catalyst.

The lower portion of vessel 11 is expanded, the transition between the upper and lower cylindrical portions being effected by frusto-conical portion 23. The upper cylindrical portion, containing the storage hopper 14 and the conversion zone or catalyst bed 15, is extended downwardly within the expanded lower cylindrical portion, as by a hollow cylindrical member 24 attached along its upper perimeter to the inner wall of the vessel 11 adjacent the lower end of the narrow cylindrical portion. The annular space between the wall of vessel 11 and cylindrical member 24 is closed at its lower end by a flat annular plate member 25, thereby forming a manifold chamber 26.

A horizontal tube-sheet 27 is secured at an intermediate level within the cylindrical member 24, and forms a support for the compact moving bed of catalyst 15. The tube sheet is provided with a plurality of elongated downwardly-extending purge nipples 28 having their upper ends set in the tube sheet and being uniformly arranged in a series of parallel rows, as shown in Figure 2. Midway between the rows of purge nipples 28 tube sheet 24 is provided with a plurality of elongated gas-conveying conduits 29 which have their lower ends set in the tube-sheet and are distributed as shown in Figure 2. Conduits 29 extend a substantial distance upward from tube-sheet 27 into the bed of catalyst 15, and support a vertically-spaced series of inverted gas-collecting channel members 31, the function and manner of operation of which is well known.

In the illustrated embodiment of the invention, three levels of gas-collecting channel members are shown, although it is to be understood that a different number of levels may be provided. Gas-collecting channel members 31 extend horizontally from left to right as shown in Figure 1, that is, in a direction normal to the rows of purge nipples 28 and conduits 29. The channel members 31 at the uppermost level are supported by the upper ends of the vertical conduits 29, and the channel members 31 at the lower levels are mounted at intermediate points along the conduits, openings to receive the conduits 29 being provided in the top of each channel. Suitable means are provided to secure the intermediate channel members 31 to the conduits 29. The lowermost level of channel members 31 preferably carry a heavier disengaging load, and they are therefore slightly wider than the channel members in the upper levels, so as to form a total disengaging surface at the lowermost level which is greater than that at any of the upper levels.

A grating 32 is placed on top of the uppermost level of channels 31 and extends horizontally across the entire bed 15. The primary function of the grating is to screen the granular material comprising the downwardly moving bed 15, thereby preventing any large fused masses of the granular material from working their way downwardly within the disengager section to block off the narrow passages between adjacent disengager channels or the inlet openings of conduits 29. Grating 32 serves also to support a portion of the weight of bed 15.

Hollow collector beams 33 extend horizontally across the lower region of cylindrical member 24 between the rows of purge nipples 28, and have their ends projecting through and supported by the side walls thereof, thereby providing open communication between the hollow collector beams and the annular manifold 26 formed between the expanded cylindrical portion of the vessel 11 and the cylindrical member 24.

Collector beams 33 comprise wide elongated plate members 34 and a narrow elongated plate member 35 forming the sides and bottom, respectively, of the hollow beam. The upper edges of side members 34 are attached, as by welding, to the underside of tube sheet 27, thereby forming a gas collecting passageway 36 of vertically-elongated rectangular cross section. The collector beams 33 serve a dual function in that they also, through side members 34, act as load-bearing members for the tube-sheet and the bed of catalyst above it and for the disengaging apparatus located above the tube-sheet.

As the catalyst in bed 15 and the accompanying gaseous hydrocarbons move concurrently downward through the disengager section, a portion of the gaseous material is disengaged at each level of channel members 31, the proportion which such portion bears to the total gaseous material being determined by the size of the orifices in the sides of conduits 29 which provide gaseous communication between the gas conveying conduits and the particle-free gas-collecting spaces formed within the bed 15 under each of the inverted channel members 31.

The gaseous material collected under each of the channels 31 passes through the orifices into conduits 29 and is conveyed downwardly therethrough into the gas-collecting passages 36. Passages 36 of the hollow beams convey the collected gaseous material horizontally into the annular manifold or plenum 26, from which they are continuously discharged through vapor outlet 37 and conveyed to apparatus, not shown, for further treatment.

Below the lowermost disengaging level, defined by the lower edges of the channel members 31 at the lowermost level, the catalyst reforms into a single compact moving bed, and flows downwardly as such until it reaches the tube sheet 27. The catalyst then passes downwardly through the purge nipples 28 as a plurality of compact moving streams. The catalyst discharges from the lower ends of nipples 28 directly onto the surface of another compact moving bed 38. The catalyst is continuously withdrawn from bed 38 through the withdrawal system 22 and is discharged through outlet 33 at the lower end of the vessel 11.

The lower ends of the purge nipples 28 extend below the lower ends of the hollow collector beams 33, in order to provide a horizontally continuous plenum space 39. Purge gas, such as steam, is introduced into plenum 39 through side inlet 41. The purge gas is distributed throughout the plenum 39 and enters the exposed surface of the catalyst bed 38 formed below the nipples 28. The purge gas then reverses its direction of flow and passes upwardly through the nipples 28 countercurrently to the descending compact streams of catalyst. From the upper ends of the nipples 28 the purge gas passes upwardly into the lower region of compact bed 15 between the lowermost level of channel members 31 and the tube-sheet 27. The purge gas is disengaged from the catalyst, together with the vaporizable hydrocarbons which it displaces and the final portion of the concurrently flowing gaseous products of conversion at the exposed surfaces of catalyst formed beneath the channel members 31 comprising the lowermost disengaging level.

The collector beams 33 therefore receive not only the total gaseous hydrocarbons, but also the purge gas which is passed upwardly from below the conversion zone. The total mixture of gaseous hydrocarbons and purge gas is then conveyed laterally into the plenum or annular space 26, and is discharged from the plenum through vapor outlet 37.

Figures 3 and 4 show another embodiment of the invention especially suitable when high sulphur stocks are being processed, since it minimizes the amount of alloy equipment required.

In this embodiment, the tube-sheet 27 is supported by horizontally elongated plate members instead of the hollow collector beams 33 of Figure 1. The plate members 42 have their ends secured to the walls of cylindrical member 24, and are provided with openings 43 to lighten the structure and permit free lateral movement of the purge gas across the lower end region of member 24. The purge nipples 28 are set higher in the tube sheet 27, thereby creating a static layer of catalyst at the bottom of the bed 19 represented by that portion of the bed located between and below the cones of solids flow leading into the upper ends of the nipples 28.

Collector tubes 44 rest upon the tube-sheet 27 directly over the plate members 42 and extend across the vessel between the rows of nipples 28 to and through the cylindrical member 24. The lower ends of vertical conveyor tubes 29 are set in the upper wall of tubes 44. The collector tubes 44 are located at or below the inlet level of nipples 28, within the static portion of the bed 19. Thus, the tube-sheet 27 is in some measure insulated from the moving portion of the catalyst mass by a layer of static catalyst. In certain applications, therefore, it may be of advantage to fabricate the tube-sheet 27 and its support members 42 of carbon steel, instead of the more expensive alloys which might otherwise be required by reason of the presence of sulphur-rich gases in contact with the metal parts.

In this embodiment, as in the embodiment of Figures 1 and 2, the collection and horizontal conveyance of the disengaged gases into the annular manifold 26 is accomplished within the vertical distance required for purging the catalyst.

The method and apparatus of the present invention effects substantial savings in overall height of the hydrocarbon conversion unit, since the purging of the catalyst is effected at a common level with the collecting of disengaged gaseous material within the conversion vessel, as distinguished from prior practices in which the steps of disengaging and collecting the gaseous material and of purging the catalyst are carried out at separate vertically-spaced levels within the conversion vessel. Although the present invention requires all the gaseous hydrocarbon material and the purge gas to be removed at the exposed disengaging surfaces of catalyst beneath the several levels of inverted channel members, instead of having a portion of the hydrocarbons and the purge gas removed directly into open-bottom beam headers or deep channels, as disclosed in my copending application, Serial No. 247,684, there is still a substantial net saving in vertical height.

Comparing the two systems, for example, it has been determined that in a vertical conversion vessel of practical commercial dimensions, a saving in vertical height up to about 15% of the height of the vessel may be effected by the present invention.

Obviously many modifications and variations of the invention as hereinbefore set forth may be made without departing from the spirit and scope thereof, and therefore only such limitations should be imposed as are indicated in the appended claims.

What is claimed is:

1. Apparatus for disengaging gas flowing concurrently through a compact moving bed of solids gravitating through a contact chamber comprising: a tube-sheet forming the lowermost boundary of said contact chamber and supporting said bed, a purge chamber beneath said tube-sheet, vertical elongated purge nipples spaced over the cross-sectional area of said contact chamber with their upper portions set in said tube-sheet and their lower portions extending to an intermediate level within said purge chamber, gas-collecting ducts horizontally coextensive with said tube-sheet and located within the spaces between said purge nipples, vertical tubes within the bottom region of said contact chamber with their lower ends in open communication with said ducts, gas-disengaging members supported by and in open communication with said vertical tubes, a manifold chamber in open communication with each of said ducts, means for introducing purge gas into said purge chamber, means at the bottom of said purge chamber for discharging said solids, and means for discharging gas from said manifold chamber.

2. Apparatus as defined in claim 1, in which said purge nipples extend a substantial distance above said tube-sheet, and said ducts are supported upon said tube-sheet within the spaces between said nipples.

3. Apparatus as defined in claim 1, in which said purge nipples have their upper ends set in said tube-sheet, and said ducts extend horizontally within the spaces between said nipples directly beneath and contiguous to said tube-sheet.

4. Apparatus as defined in claim 1, in which said nipples are arranged in parallel rows extending across said tube-sheet, and said gas-collecting ducts are parallel to and located within the spaces between said rows.

References Cited in the file of this patent
UNITED STATES PATENTS

| | | |
|---|---|---|
| 2,526,625 | Ardern | Oct. 24, 1950 |
| 2,546,625 | Bergstrom | Mar. 27, 1951 |